No. 687,308. Patented Nov. 26, 1901.
P. H. HAWKINS.
APPARATUS FOR CASING AND FLAVORING TOBACCO.
(Application filed Apr. 12, 1901.)
(No Model.) 2 Sheets—Sheet 1.
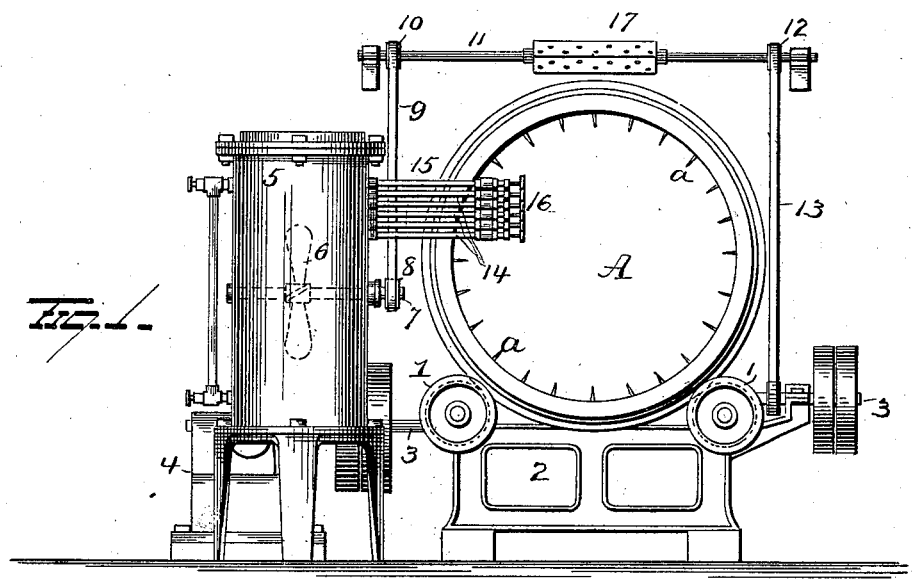
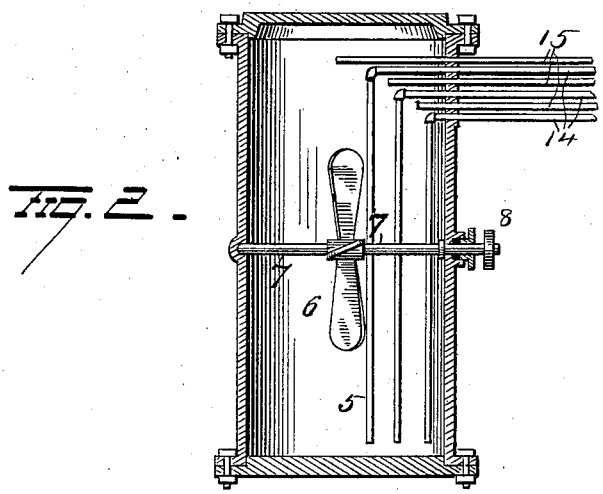

No. 687,308.  
P. H. HAWKINS.  
APPARATUS FOR CASING AND FLAVORING TOBACCO.  
(Application filed Apr. 12, 1901.)
Patented Nov. 26, 1901.
(No Model.)
2 Sheets—Sheet 2.
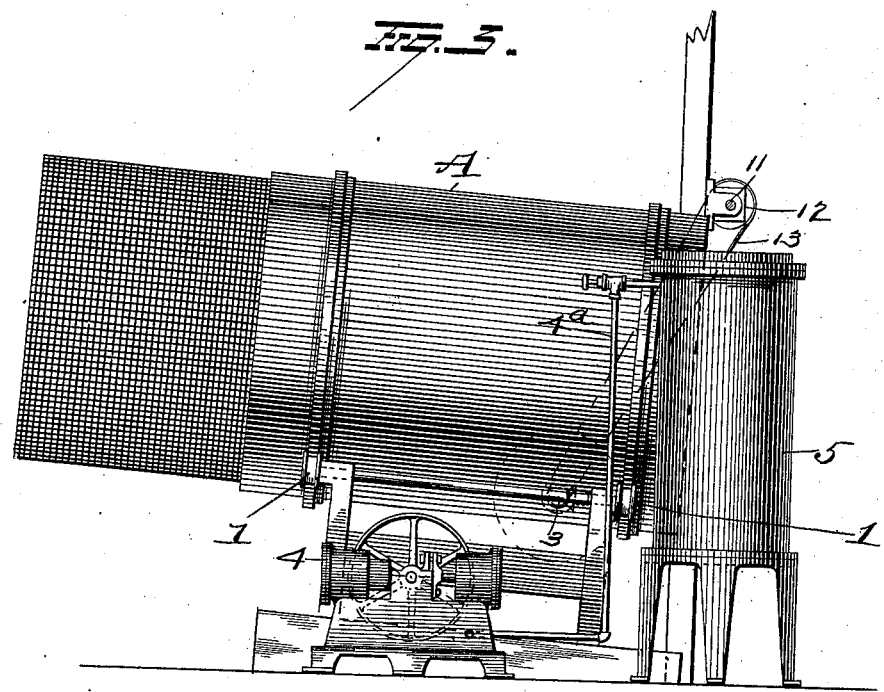
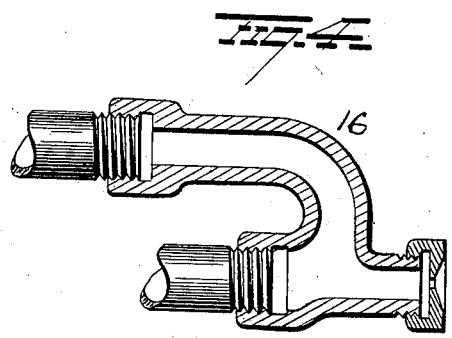
WITNESSES
INVENTOR  
P. H. Hawkins  
By N. G. Seymour  
Attorney

UNITED STATES PATENT OFFICE.

PEYTON H. HAWKINS, OF PETERSBURG, VIRGINIA, ASSIGNOR OF THREE-FOURTHS TO WILLIAM P. MAYO, WILLIAM J. WHITEHURST, AND SAMUEL P. MAYO, OF RICHMOND, VIRGINIA.

APPARATUS FOR CASING AND FLAVORING TOBACCO.

SPECIFICATION forming part of Letters Patent No. 687,308, dated November 26, 1901.

Application filed April 12, 1901. Serial No. 55,531. (No model.)

*To all whom it may concern:*

Be it known that I, PEYTON H. HAWKINS, of Petersburg, in the county of Dinwiddie and State of Virginia, have invented certain new and useful Improvements in Apparatus for Casing and Flavoring Tobacco; and I do hereby declare the following to be a full, clear, and exact description of the invention, such as will enable others skilled in the art to which it appertains to make and use the same.

My invention relates to an improvement in apparatus for casing and flavoring tobacco, the object of the invention being to provide simple and efficient means for keeping the casing and flavoring fluids thoroughly mixed and to supply such a mixture and also powdered flavoring material uniformly to the tobacco for thoroughly casing and flavoring it.

With these objects in view the invention consists in certain novel features of construction and combinations and arrangement of parts, as hereinafter set forth, and pointed out in the claims.

In the accompanying drawings, Figure 1 is a front elevation of a casing and flavoring machine embodying my invention. Fig. 2 is a sectional view of a portion of the apparatus. Fig. 3 is a side elevation of the apparatus. Fig. 4 is a detail view of one of the atomizers 16.

A represents a cylinder provided internally with numerous pins $a$ for lifting the tobacco, and said cylinder is revolubly supported on driving-wheels 1, mounted on a suitable base 2. The shaft 3, driven by a suitable motor, is connected through the medium of proper gearing with the wheels 1 to transmit motion thereto for rotating the cylinder. A vertically-disposed cylinder 5 is located in proximity to the cylinder A for the reception of the saccharine casing material and the flavoring-liquid to be applied to the tobacco passing through said cylinder A. The liquid flavoring material usually consists of essential oils, which are of much higher specific gravity than the saccharine casing material and are therefore liable to float on the latter. It is a matter of importance, however, that the fluid casing and flavoring materials shall be applied to the tobacco in proper proportions, and it is desirable that these two fluids shall be supplied simultaneously to the tobacco. It is necessary, therefore, that the saccharine casing fluid and the flavoring fluid be kept thoroughly mixed, and for this purpose I locate within the cylinder 5 a stirrer or agitator 6. The shaft 7 of this stirrer or agitator is provided with a pulley 8, to which motion is transmitted by a belt 9 passing over a pulley 10 on a shaft 11. The shaft 11 is also provided with a pulley 12, to which motion is imparted by a belt 13 from the shaft 3. A series of pipes 14 enter the upper end of the cylinder 5 and extend to the bottom thereof, and another series of pipes 15 enter and communicate with the upper portion of said cylinder. A series of atomizers 16 are located within the cylinder A, and one pipe of each series 14 15 communicates with each atomizer. The fluids in the cylinder are caused to flow through the pipes 14 by air-pressure in the upper portion of the cylinder 5, which air may be forced into the upper portion of said cylinder from a pump 4 by means of a pipe $4^a$. A portion of the compressed air in the cylinder 5 will flow through the pipes 15 and be ejected at the atomizers, thus causing the mixed casing and flavoring fluids to be atomized or sprayed on the tobacco passing through the cylinder A.

In addition to the liquid flavoring material applied to the tobacco, as above explained, it is desirable, in order to thoroughly flavor the tobacco, to apply a powdered flavoring material thereto as the tobacco passes through the end of the cylinder. This I accomplish in a simple and efficient manner by means of a perforated receptacle 17, (preferably angular in cross-section, so as to more effectually scatter the powder onto the tobacco,) secured rigidly to the shaft 11.

By means of the devices above described I am enabled to case and flavor tobacco quickly and in a thoroughly efficient manner.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In an apparatus for casing and flavoring tobacco, the combination with a revoluble cylinder for tobacco, of a cylinder for casing and flavoring liquids, an agitator in said last-mentioned cylinder for keeping the casing and flavoring liquids mixed and means for conveying said liquids with air into the revoluble cylinder and spraying them onto tobacco in said revoluble cylinder.

2. In a tobacco casing and flavoring apparatus, the combination with a cylinder for tobacco, of means for constantly mixing liquid casing and flavoring material and spraying them simultaneously on tobacco in said cylinder.

3. The combination with a revoluble cylinder, of a revoluble perforated receptacle over one end of said cylinder for sprinkling powdered flavoring material on the tobacco passing through said cylinder.

4. The combination with a revoluble cylinder and a motor or engine for rotating it, of a stationary cylinder for casing and flavoring liquids, means for spraying the mixed liquids on tobacco in the revoluble cylinder, an agitator in said stationary cylinder, a shaft over the revoluble cylinder, a sprinkler for powdered flavoring material carried by said shaft, means for transmitting motion from said shaft to the agitator and means for transmitting motion to said shaft from the shaft of the motor or engine.

In testimony whereof I have signed this specification in the presence of two subscribing witnesses.

PEYTON H. HAWKINS.

Witnesses:
R. C. KILMARTIN,
C. A. PEANUTER.